(12) United States Patent
Alsup (10) Patent No.: US 6,349,073 B1
(45) Date of Patent: Feb. 19, 2002

(54) SONAR SYSTEM AND METHOD EMPLOYING A POWER-EFFICIENT TRIPLET-PAIR COMB WAVEFORM

(75) Inventor: James M. Alsup, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/745,610

(22) Filed: Dec. 22, 2000

(51) Int. Cl.[7] .............................................. G01S 15/04
(52) U.S. Cl. ...................................................... 367/101
(58) Field of Search ................................. 367/137, 901, 367/101, 94, 99

(56) References Cited

PUBLICATIONS

Cox, Space–Time Processing for Suppression of Bottom Reverberation; 1996 IEEE Proceedings of Asilomar–29; pp. 1296–1299.*
"Geometric Comb Waveforms for Reverberation Suppression", Henry Cox and Hung Lai, Orincon corp., 1058–6393/95, 1995 IEEE.
"Doppler–Sensitive Active Sonar Pulse Designs for Reverberation Processing", T. Collins and P. Atkins, IEE Proc–Radar, Sonar Navig. vol. 145, No. 6, Dec. 1998.
"Comb Waveforms For Sonar", James M. Alsup, Thirty–Third Asilomar Conference on Signals, Systems, & Computers, Oct. 24–27, 1999 Published Feb. 2000.

* cited by examiner

*Primary Examiner*—Daniel T. Pihulic
(74) *Attorney, Agent, or Firm*—Harvey Fendelman; Michael A. Kagan; James A. Ward (57) ABSTRACT

An active sonar system with improved noise-limited performance in littoral regions with reverberation. This invention solves the active sonar comb-waveform power-limitation problem by introducing for the first time a system employing a new comb waveform herein denominated the triplet-pair comb waveform. Ambient noise-limited performance of the system of this invention is superior to that of systems employing other Doppler-sensitive waveforms such as the geometric comb waveform. Reverberation-limited performance of the system of this invention is slightly inferior to that of systems employing other Doppler-sensitive waveforms but this invention eliminates much of the range ambiguity problems seen with other non-comb waveforms.

4 Claims, 6 Drawing Sheets

SONAR SYSTEM AND METHOD EMPLOYING A POWER-EFFICIENT TRIPLET-PAIR COMB WAVEFORM

BACKGROUND OF THE INVENTION

1. Field of the Invention

This invention relates generally to active sonar systems and more particularly to methods for optimizing noise-limited and reverberation-limited target detection in littoral regions.

2. Description of the Prior Art

A major problem for sonar systems operating in shallow water is reverberation from the ocean bottom. With expanding Navy operation in littoral regions, the shallow-water reverberation problem has received much recent attention from practitioners in the art. In 1995, Henry Cox et al. (Cox and Lai, "Geometric Comb Waveforms for Reverberation Suppression," *Proceedings, Twenty-Ninth Asilomar Conference on Signals, Systems, and Computers,*" Pacific Grove, Calif., Oct. 29–Nov. 1, 1995, pp. 1185–1189) proposed a class of geometric comb waveforms that offer high range resolution and excellent Doppler properties for active sonar detection of moving targets in reverberation. Until the introduction of the geometric comb waveform, active sonar practitioners were limited to fighting reverberation by using one of two methods: a spectrally-flat wide-band pulse to spread reverberation noise power over the wide pulse band and minimize reverberation power in each range bin, or a long shaded (e.g., Hanning-weighted) continuous-wave (CW) pulse to concentrate reverberation noise power at the zero-Doppler bin and permit detection of non-zero Doppler targets. The flat wide-band pulse approach has limited effectiveness in multipath echo environments such as encountered in littoral regions and the CW shaped-pulse approach achieves Doppler reverberation rejection at the expense of range resolution. The uniform comb waveform is a variation of the wide-band pulse method that uses a plurality of equally-spaced spectral components (CW tone pulses) where the spacing is selected to be large with respect to the target Doppler shifts. Each spectral component provides an echo with properties similar to the wide-band pulse approach but coherent addition of a plurality N of such spectral components provides a processing gain of 10 log N over a single CW pulse. However, the uniform comb signal is disadvantaged by the large peak-to-average power ratio (large dynamic range) of the transmitted signal, which severely limits available average signal power levels needed in noise-limited environments, and by severe range ambiguity resulting from multiple equal amplitude peaks in the autocorrelation function.

The Cox geometric comb waveform solved the range ambiguity problem by using a plurality of non-uniformly-spaced spectral components (CW tone pulses) whose frequencies are spaced according to a geometric progression. While the geometric comb waveform has been welcomed with enthusiasm by active sonar practitioners because of excellent Doppler properties for suppressing reverberation with acceptable range ambiguity, the peak-to-average power problem, while improved by nearly 10 dB over the uniform comb signal, is still disadvantageous in noise-limited littoral regions. Cox et al. suggest easing the problem somewhat by clipping the spectral-component peaks to reduce the requisite transmitter dynamic range, but this introduces spectral distortion that can corrupt other processing gains.

T. Collins et al. (Collins and Atkins, "Doppler-Sensitive Active Sonar Pulse Designs for Reverberation Processing," *IEE Proc.-Radar, Sonar Navig.,* Vol. 145, No. 6, December 1998, pp.347–353) later compare the theoretical and experimental performance of several reverberation-insensitive active sonar waveforms. Collins et al. show that the linear period-modulated (LPM) chirp waveform is best for low Doppler targets at long ranges and the sinusoidally frequency-modulated (SFM) pulse waveform is preferred for suppressing reverberation effects, except that the Cox comb waveform eliminate much of the range-ambiguity of the SFM system.

Many littoral regions have negligible reverberation and detection capability is accordingly ambient-noise limited over some portion of the nominal detection range of an active sonar system. This may occur in slightly deeper water at close range or in shallow water at longer range. Because active sonar transmitters suitable for littoral operation are normally power- and duty-cycle-limited, there is a need for transmit waveforms with dynamic range limited to make use of as much available power as possible. Collins et al. suggest that the SFM waveform is preferred over the Cox comb waveform despite the resulting range-ambiguity problems because of the improved noise-limited performance of the higher average transmitter power available from SFM.

There is accordingly still a clearly-felt need in the art for an active sonar system that provides improved detection performance in either reverberation-limited or noise-limited littoral regions. These unresolved problems and deficiencies are clearly felt in the art and are solved by this invention in the manner described below.

SUMMARY OF THE INVENTION

This invention solves the active sonar comb-waveform power-limitation problem by introducing for the first time a system employing a new comb waveform herein denominated the triplet-pair comb waveform. Ambient noise-limited performance of the system of this invention is superior to that of systems employing other Doppler-sensitive waveforms such as the geometric comb waveform. Reverberation-limited performance of the system of this invention is slightly inferior to that of systems employing other Doppler-sensitive waveforms but this invention eliminates much of the range ambiguity problems seen with other non-comb waveforms.

It is a purpose of this invention to provide an active sonar system with improved noise-limited performance in littoral regions with reverberation.

In one aspect, the invention is an acoustic detection method comprising the steps of transmitting an acoustic signal employing a triplet-pair comb waveform to ensonify a target area, detecting acoustic reflections from the target area at a receiver transducer, generating a transducer output signal representing the acoustic reflections, and processing the transducer output signal to determine range and Doppler values for the target area.

In a preferred embodiment, the invention is an acoustic detection apparatus comprising an acoustic transmitter for transmitting an acoustic signal to ensonify a target area, wherein the acoustic signal includes a triplet-pair comb waveform, a receiver transducer for detecting acoustic reflections from the target area, a circuit for generating a transducer output signal representing the acoustic reflections, and a signal processor for processing the transducer output signal to determine range and Doppler values for the target area.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

The active sonar system of this invention is adapted for use in littoral regions at frequencies of 100–1000 Hz. In such waters, relative shallow depths can account for a drastic decrease in passive-Sonar target detection range and a concomitant drastic increase in active-sonar reverberation levels from sea-floor scattering, relative to deeper ocean regions.

Active target detection in many littoral environments is ambient-noise limited (negligible reverberation levels) over some part of the nominal detection range of an active sonar system. For these situations, power-efficient waveforms are important for maintaining or improving detection performance. Because sonar projectors operating in the 100–1000 Hz acoustic spectrum are usually power-limited, effective noise-limited operation requires the use of as much available transmitter power as possible. In these situations, waveform gain can be expressed as follows:

$$WG_{AN}=PG+PF \quad \text{[Eqn. 1]}$$

$$PG=10*\log(T*W) \quad \text{[Eqn. 2]}$$

$$PF=20*\log(\eta) \quad \text{[Eqn. 3]}$$

where:
$WG_{AN}$=waveform gain in ambient noise;
PG=processing gain;
PF=power factor;
T=waveform duration;
W=waveform bandwidth;
$\eta$=waveform efficiency, the ratio of the power radiated by the subject waveform to the power radiated by a uniformly-weighted single-frequency tone ping at the center of the waveform's frequency band.

Active target detection in other littoral environments is reverberation-limited (negligible ambient-noise levels) over some part of the nominal detection range of an active sonar system. This usually occurs for close to intermediate target ranges in shallow water. Reverberation is likely to be dominated by reflections from bottom-scatterers, which have intrinsic Doppler of zero. The observed Doppler is generally narrowly-distributed about zero Doppler, which is visualized as a "ridge" centered at zero Doppler on a range & Doppler vs. received energy contour diagram. The Q-function (see G. W. Deley, "Waveform Design," Chapter 3 of *Radar Handbook*, M. I. Skolnik, editor, McGraw-Hill, New York, 1980), which is defined as the integral of the waveform ambiguity function taken along constant Doppler, illuminates the extent to which the zero-Doppler ridge may mask the target echo. The Q-function is known to express reverberation suppressability versus target Doppler.

Waveform power efficiency is not an issue in reverberation-limited operating regions because processed echo-to-reverberation ratios are nominally independent of the transmitter power level. But the system range-resolution determined the vertical offset of the Q-function and system Doppler resolution determines the slope of the Q-function in the zero-Doppler region. For any signal waveform, the Q-function amplitude is reduced by $10*\log(W)$, where W is the effective signal bandwidth. For comb waveforms, W is proportional to the "filled" portion of the spectrum, which is generally much less than the spectral span of the comb component frequencies. The Q-function slope near zero-Doppler is steeper for comb waveforms of duration, T, relative to the (single-valued) comb spectral component duration, $T_C$. So, for example, when $T_C=2*T/(M+1)$ for the M spectral components of a FHOP comb waveform, the Q-function slope is reduced drastically with respect to the same slope for a sinusoidal frequency-modulated (SFM) comb waveform (for which $T_C=T$).

The ambiguity function (see, for example, A. W. Rihaczek, *Principles of High-Resolution Radar*, McGraw-Hill, New York, 1969) is a well-known tool for examining the range and Doppler resolution properties of active sonar waveforms. As is well-known (see, for example, C. E. Cook & M. Bernfeld, *Radar Signals, an Introduction to Theory and Practice*, Academic Press, New York, 1967), the ambiguity function is a three-dimensional representation of the point-target response of the sonar waveform as a function of range and Doppler. Resolution granularity is important for both range and Doppler. Good range resolution reduces signal-to-reverberation ratio (SRR) by reducing the effective size of the scatterers seen by the sonar receiver when processing returns for a particular beam/range/Doppler bin. To improve range resolution over that available from the CW-Hanning tone ping, comb waveforms generally, the spectral-component spacings in comb waveforms must be unequal. Good Doppler resolution improves signal-to-interference ratio (SIR) by rejecting interference energy at all Doppler values other than the target Doppler bin. During reverberation-limited operation, the detection of target echos at low Doppler values can be improved by using comb waveforms having the best Doppler resolution; that is, those where the comb spectral component duration, $T_C$, is equal to the waveform transmission duration, T.

Table 1 presents a representative but incomplete list of useful active sonar system waveforms and identifies the qualitative standings of the respective Doppler resolution, range resolution and power efficiency characteristics. Table 1 is organized into Doppler-sensitive (comb waveform) and Doppler-insensitive categories. The Cox (geometric) comb waveform is important in the art because of its apparent high Doppler sensitivity at moderately good range resolution. The Cox comb waveform exhibits poor power efficiency, however. The Exponential Residue Codes waveform can be appreciated with reference to J. Alsup, "Exponential Residue Codes," *IEEE Transactions on Aerospace and Electronic Systems,* November 1975, pp. 1389–90.

TABLE 1

| Waveform | Resolution | | Power Efficiency |
|---|---|---|---|
| | Range | Doppler | |
| Doppler Insensitive | | | |
| Linear Frequency Modulation (LFM) | high | low | high |
| Hyperbolic Frequency Modulation (HFM) | high | low | high |
| Rooftop (HFM or LFM) | high | low | high |
| Golay Complementary Pairs | high | low | high |
| Pseudo-Random Noise (PRN) | high | low | high |
| Exponential Residue Codes | high | low | high |
| Doppler Sensitive | | | |
| Single-Frequency Pulse (CW) | low | high | medium |
| FHOP Comb | medium | low | high |
| Newhall Comb (LFM, HFM) | low | high | medium |
| Sinusoidal Frequency-Modulation (SFM) | low | high | medium |
| Cox Geometric Comb | medium | high | low |
| Triplet-Pair Comb of this invention | medium | high | medium |

The Triplet-Pair (TP) comb waveform described herein below, for the first time offers improved power-efficiency in addition to the other advantages of the Cox geometric comb waveform. The TP comb overcomes the low power efficiency of the Cox comb while retaining most of its improved range resolution and excellent Doppler sensitivity.

FIGS. 1A–1D illustrate exemplary representations of comb waveform spectra for identical waveform parameters of 500 Hz center frequency ($f_C$), 10 second duration (T), 50 Hz bandwidth (W) and twelve in-band spectral components or "tines" (M).

In accordance with the method of this invention, the TP comb waveform of this invention is specified by the following steps:

Step (a) Choose the approximate number of comb spectral components (tines), M', needed to provide a desired ambiguity-free Doppler regime, D', in knots, such that:

$$M'=1+(W/(0.007*f_C*D')) \quad \text{[Eqn. 4]}$$

Step (b) Choose the actual number of comb tines, M, as a multiple of six to ensure an even number of triplet pairs, and compute the average tine separation, $\Delta f$, such that:

$$M=6*\text{round}(M'/6) \quad \text{[Eqn. 5]}$$

$$\Delta f=W/(M-1) \quad \text{[Eqn. 6]}$$

Step (c) Arrange the tines into sets of triplets and spectrally-weight each triplet by the vector (−1 2 −1) for form an even number of weighted triplets.

Step (d) Arrange all weighted triplets into N pairs of weighted triplets and assign a frequency spacing $\Delta f_i$, (i=1, . . . , N), between the tines within each triplet for the $i^{th}$ triplet-pair such that the internal tine spacing is uniform for the two triplets of the $i^{th}$ triplet-pair.

Step (e) Without disturbing the triplet internal tine spacing uniformity, assign different frequency spacings between frequency-adjacent triplets (that are not necessarily members of the same triplet pair) such that the overall TP comb tine frequency-spacing distribution approximate the tine frequency-spacing distribution of a geometric comb.

Step (f) Generate a vector of time-domain samples for each of the M spectral components (tines) and delay the time-domain phase of each vector for the tines in the second triplet of each triplet-pair by $(0.5/\Delta f_i)$.

Step (g) Generate each of the N triplet-pair waveform elements by:
  (1) summing the time-domain vectors for the six tines in the $i^{th}$ triplet-pair; and
  (2) applying a Hanning window of length $T_H=2*T/(N+1))$ to the resulting summation, where the Hanning window begins at a time delay of $(i-1)*T_H/2$ for the $i^{th}$ triplet-pair.

Step (h) Form the final TP waveform by summing the N triplet-pair waveform elements.

Figure 1A:
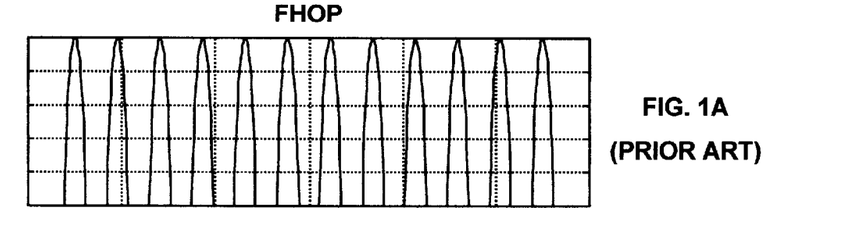
FIGS. 1A–1D illustrate exemplary representations of comb waveform spectra from the prior art.
Figure 1B:
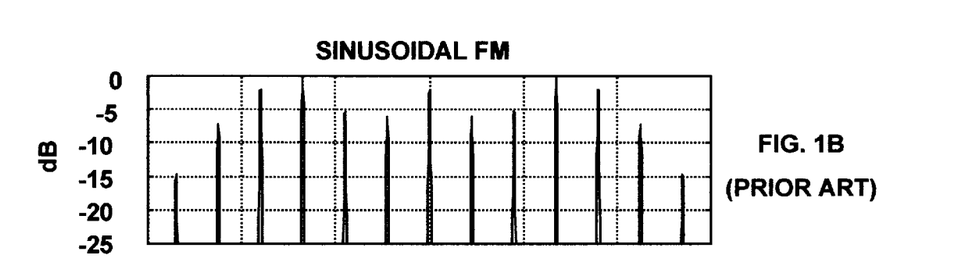
Figure 1C:
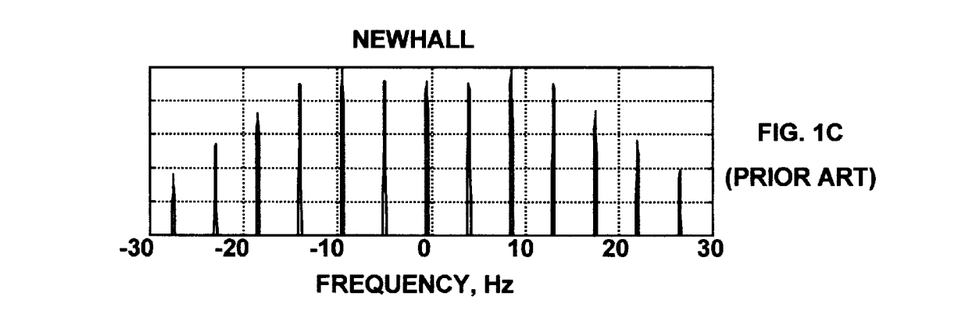
Figure 1D:
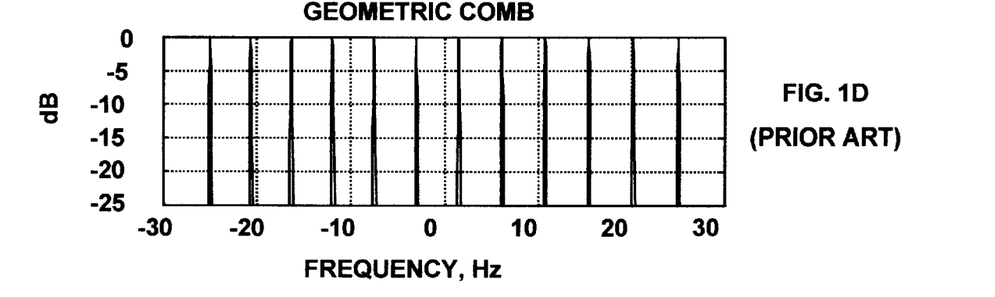
Figure 2:
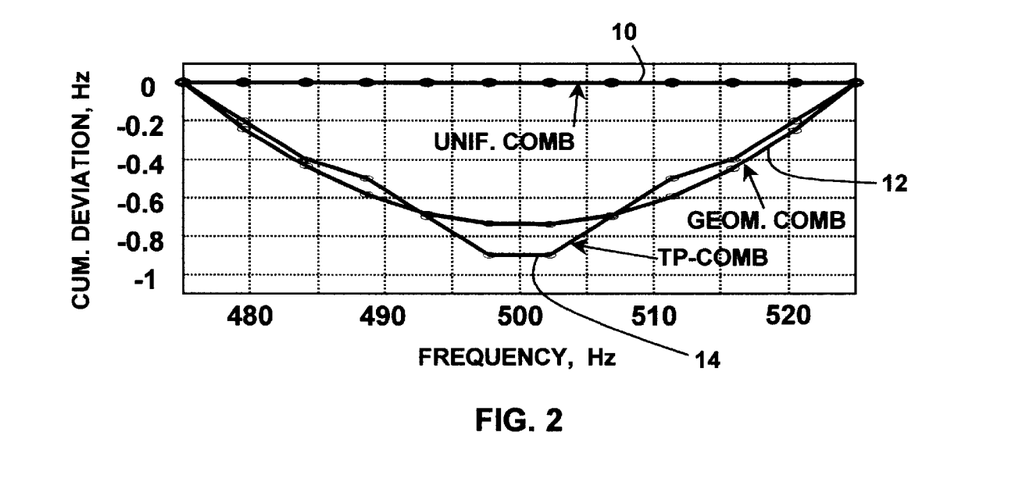
FIG. 2 shows a graphical representation of the cumulative frequency-deviation from uniformity over the spectral component (tine) sequence of several exemplary comb waveforms including an exemplary triplet-pair comb waveform of this invention.

FIG. 2 shows a graphical representation of the cumulative frequency-deviation from uniformity over the spectral component (tine) sequence of several exemplary comb waveforms. The waveform parameters used in this example are: $f_C$=500 Hz, V=50 Hz, and D=13 knots. In FIG. 2, the line 10 shows the uniform frequency-spacing characteristic for a Uniform Comb waveform having twelve equally-spaced tines. The line 12 shows the geometric frequency-spacing characteristic of the Cox geometric comb having 12 tines spaced in accordance with the Cox method. For these exemplary parameters, the method of this invention defines a TP comb having twelve tines organized into two triplet-pairs. The line 14 shows the frequency-spacing characteristic for this exemplary embodiment of the TP comb waveform of this invention. The deviations from equal spacing are chosen to be the vector 0.1*[−2 −2 −1 −2 −2 0 2 2 1 2 2] Hz. This results in a spectral component vector [475.00 479.35 483.69 488.14 492.48 496.83 501.37 506.12 510.86 515.51 520.25 525.00] for this example. Note the uniform internal spacing within each triplets, which is an important feature of this invention. The inter-triplet spacings for TP comb 14 were chosen to "approximate" the spacing characteristic of the Cox comb 12 to retain the advantageous range and Doppler resolution of the Cox comb. The degree of approximation can be readily appreciated from FIG. 2.

Figure 3:
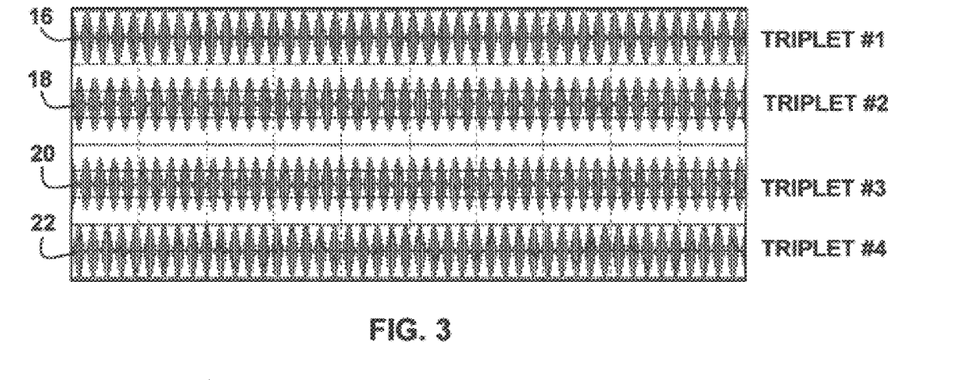
FIG. 3 shows a graphical representation in the time domain of the individual triplet sub-waveforms making up the exemplary triplet-pair comb waveform of FIG. 2.
Figure 4:
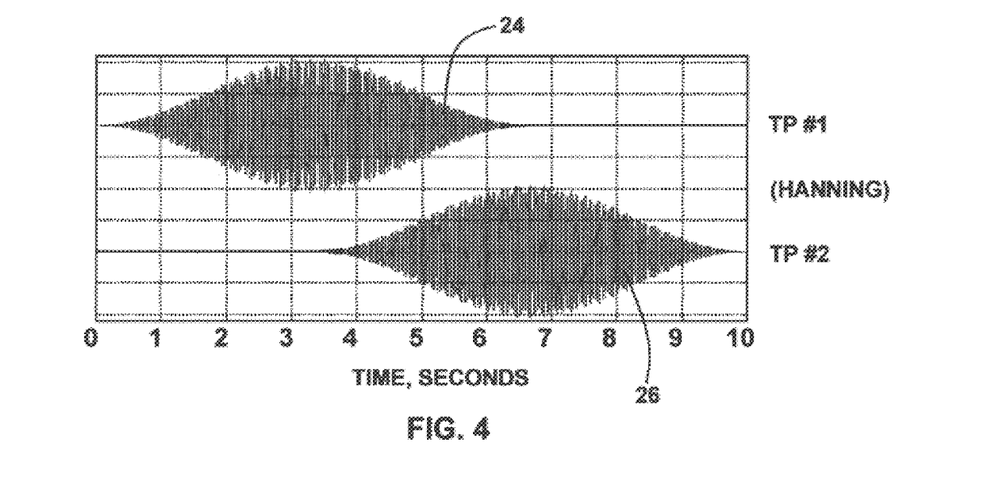
FIG. 4 shows a graphical representation in the time domain of the individual triplet-pair sub-waveforms making up the exemplary triplet-pair comb waveform of FIG. 2.
Figure 6:
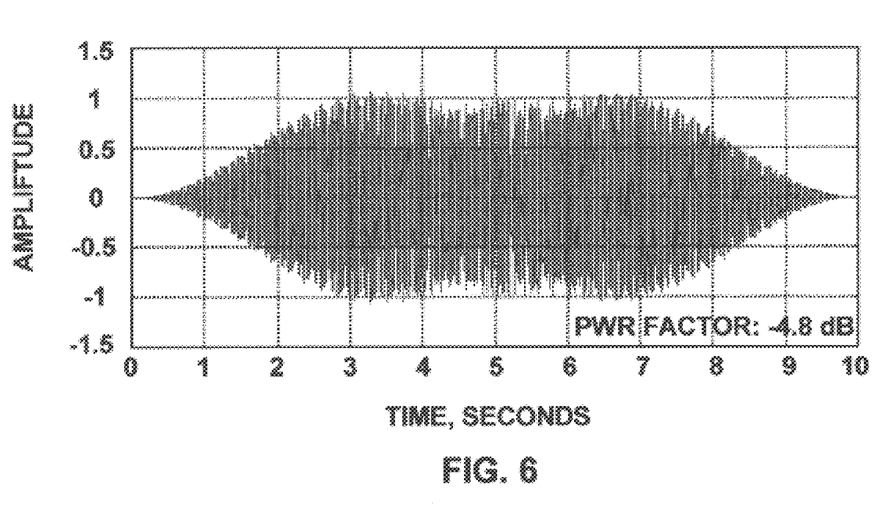
FIG. 6 shows a graphical representation in the time domain of the complete exemplary triplet-pair comb waveform of FIG. 2.

FIG. 3 shows a graphical representation of the individual triplet sub-waveforms (step (f) above) in the time domain, including the first triplet waveform 16, the second triplet waveform 18, the third triplet waveform 20, and the fourth triplet waveform 22. FIG. 4 shows a graphical representation of the two individual triplet-pair sub-waveforms 24 and 26 from the above example after Hanning-windowing in the time domain (step (g) above). The complete exemplary TP comb waveform in the time domain is shown in FIG. 6

Figure 5A:
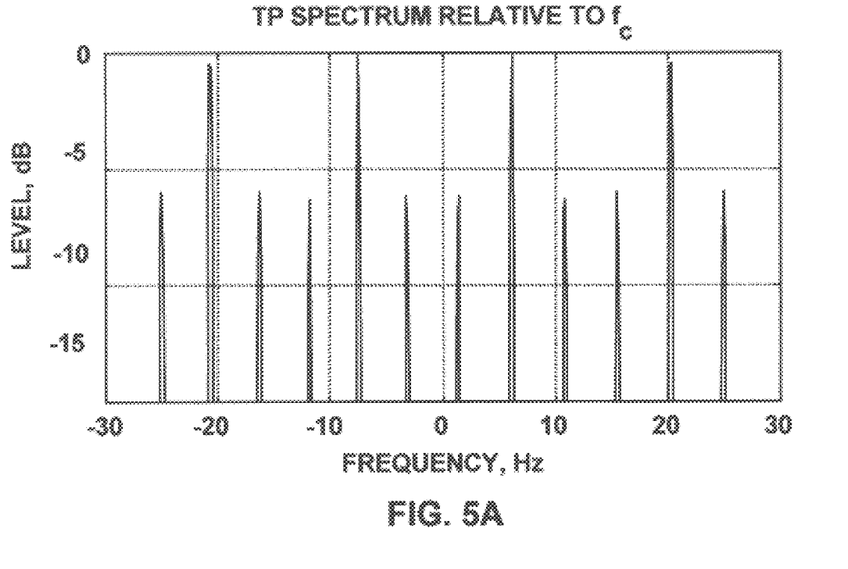
FIGS. 5A–5B show a graphical representation in the frequency domain of the twelve spectral components of the exemplary triplet-pair comb waveform of FIGS. 2–4 and a graphical representation of the associated autocorrelation function.
Figure 5B:
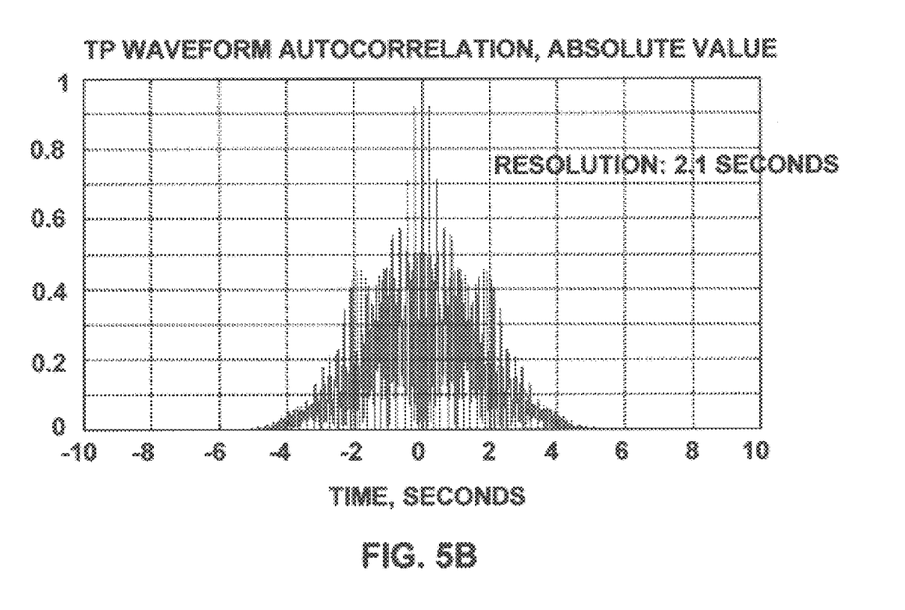

FIG. 5A shows a graphical representation of the twelve spectral components of the exemplary TP comb waveform discussed above and FIG. 5B shows a graphical representation of the absolute value of the autocorrelation function of the same exemplary TP comb waveform, which can be shown to have a delay resolution of 2.1 seconds at −6 dB. This exemplary TP comb waveform can be shown to have a power factor of −4.8 dB, which improves the −9.7 dB power factor of the associated Cox comb waveform 12 (FIG. 2) by a factor of 300%.

Table 2 below shows the results of a noise-limited operating comparison made by the inventor of three Doppler-sensitive waveforms using the exemplary operating parameters described above. Note that the TP comb offers waveform gain in ambient-noise-limited environments superior to either the Cox comb or the CW-Hanning tone.

TABLE 2

| Waveform | Power Gain dB | Power Factor dB | Waveform Gain dB |
|---|---|---|---|
| Triplet-Pair Comb | 2.6 | −4.8 | −2.2 |
| Cox Geometric Comb | 3.5 | −9.7 | −6.2 |
| CW-Hanning Tone Ping | −2.3 | −4.3 | −6.6 |

Figure 7A:
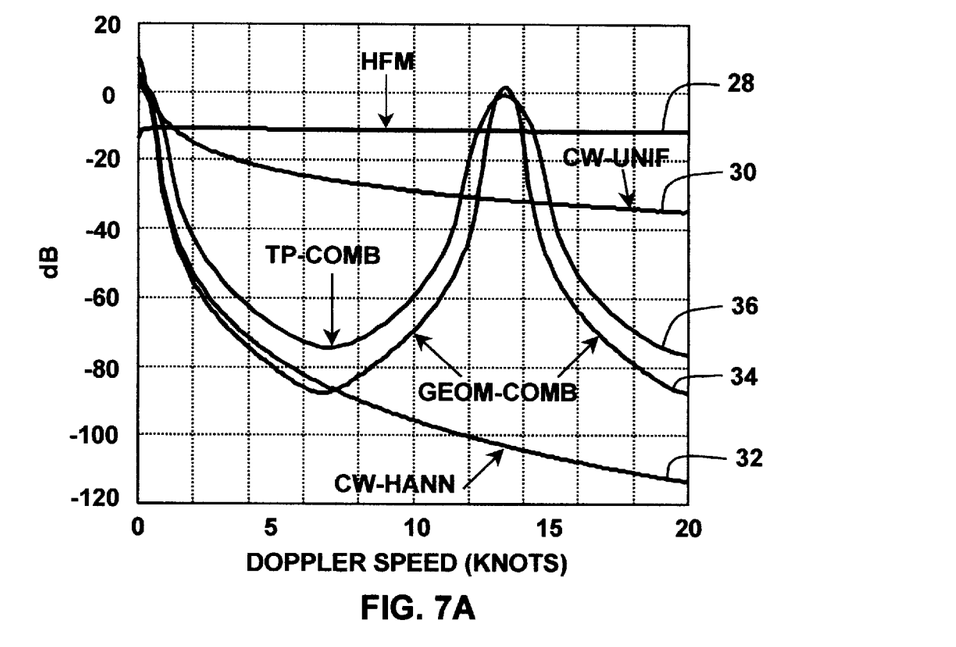
FIGS. 7A–7B show graphical representations at two resolutions of the Q-function for several waveforms including the exemplary waveforms of FIG. 2.
Figure 7B:
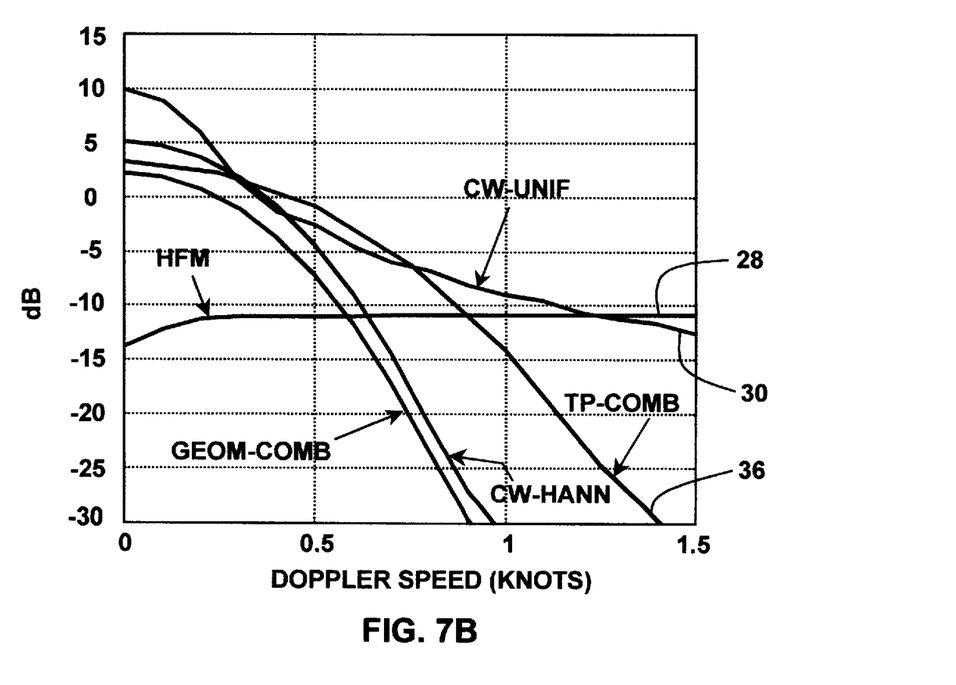

FIGS. 7A–7B show graphical representations at two resolutions of the Q-function for five waveforms. The relative reverberation-limited performance of these five waveforms are compared using the above-described exemplary waveform parameters. The line 28 represents the HFM pulse (Table 1), the line 30 represents a uniform continuous-wave (CW) pulse, the line 32 represents the Hanning-shaded CW pulse (Table 1), the line 34 represents the Cox geometric comb (FIG. 2) and the line 36 represents the triplet-pair comb waveform of this invention. FIG. 7A shows reverberation-limited detection performance over the entire Doppler region of interest from zero to 20 knots Doppler. FIG. 7B shows reverberation-limited detection performance close to the zero-Doppler hump from zero to 1.5 knots Doppler. Table 3 characterizes this performance by determining at which Doppler a given Doppler-sensitive waveform provides reverberation-suppression (a) equal to or (b) 10 dB better than the HFM waveform designed for the same system with the same exemplary parameters described above.

TABLE 3

| | Suppression of Target Doppler below (knots) | |
|---|---|---|
| Waveform | Equal to HFM | −10 dB of HFM |
| Cox Geometric Comb | .58 | .76 |
| CW-Hanning Tone Ping | .64 | .80 |
| CW Uniform Pulse | .90 | 1.16 |
| Triplet-Pair Comb | 1.24 | 4.01 |

From the above teachings, is may be readily appreciated that the Cox Geometric Comb and CW-Hanning waveforms offer slightly better reverberation-limited performance than does the triplet-pair comb waveform of this invention but the triplet-pair comb waveform offers noise-limited performance substantially better than do either of these other waveforms.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. An acoustic detection method comprising the steps of:
    transmitting an acoustic signal employing a triplet-pair comb waveform to ensonify a target area;
    detecting acoustic reflections from the target area at a receiver transducer;
    generating a transducer output signal representing the acoustic reflections; and
    processing the transducer output signal to determine range and Doppler values for the target area.

2. The method of claim 1 wherein the triplet-pair comb waveform has a bandwidth W and a center frequency $f_c$ and includes one or more ($N \geq 1$) pairs of spectral component triplets defined by:
    choosing a plurality $2*N$ of spectral component triplets each comprising three spectral components separated uniformly in frequency by a frequency-spacing $\Delta f = W/(M-1)$ such that $N = 3* \operatorname{round}((1+(W/(0.007*f_c*D')))/3)$, wherein $D'$ is a predetermined ambiguity-free Doppler regime and N is an integer;
    weighting the three sequential spectral components within each of the spectral component triplets by the vector $(-1, 2, -1)$ in the spectral domain to form a plurality $2*N$ of weighted triplets;
    adjusting the frequency-spacing to $\Delta f_i$ within each of the N weighted-triplet pairs, wherein $i=1, 2, \ldots, N$; and
    adjusting the frequency-spacing between adjacent weighted triplets to $\Delta f_n$ such that the plurality $6*N$ of spectral components are disposed in an approximate geometric sequence, wherein $n=1, 2, \ldots, (2*N-1)$.

3. An acoustic detection apparatus comprising:
    an acoustic transmitter for transmitting an acoustic signal to ensonify a target area, wherein the acoustic signal includes a triplet-pair comb waveform;
    a receiver transducer for detecting acoustic reflections from the target area;
    a circuit for generating a transducer output signal representing the acoustic reflections; and
    a signal processor for processing the transducer output signal to determine range and Doppler values for the target area.

4. The apparatus of claim 3 further comprising:
    a waveform generator for producing the triplet-pair comb waveform having a bandwidth W and a center frequency $f_c$ and includes one or more ($N \geq 1$) pairs of spectral component triplets defined by:
    choosing a plurality $2*N$ of spectral component triplets each comprising three spectral components separated uniformly in frequency by a frequency-spacing $\Delta f = W/(M-1)$ such that $N = 3* \operatorname{round}((1+(W/(0.007*f_c*D')))/3)$, wherein $D'$ is a predetermined ambiguity-free Doppler regime and N is an integer;
    weighting the three sequential spectral components within each of the spectral component triplets by the vector $(-1, 2, -1)$ in the spectral domain to form a plurality $2*N$ of weighted triplets;
    adjusting the frequency-spacing to $\Delta f_i$ within each of the N weighted-triplet pairs, wherein $i=1, 2, \ldots, N$; and
    adjusting the frequency-spacing between adjacent weighted triplets to $\Delta f_n$ such that the plurality $6*N$ of spectral components are disposed in an approximate geometric sequence, wherein $n=1, 2, \ldots, (2*N-1)$.

* * * * *